US012646093B1

(12) United States Patent
Dwarakanathan et al.

(10) Patent No.: US 12,646,093 B1
(45) Date of Patent: Jun. 2, 2026

(54) SYSTEMS AND METHODS FOR REAL-TIME KEYWORD RECOMMENDATIONS

(71) Applicant: Amazon Technologies, Inc., Seattle, WA (US)

(72) Inventors: Srinivasan Dwarakanathan, Austin, TX (US); Zhiwei Gao, Mississauga (CA); Michael Ariaga, Pflugerville, TX (US); Sravya Sri Vankayalapati, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/606,671

(22) Filed: Mar. 15, 2024

(51) Int. Cl.
| | |
|---|---|
| *G06Q 30/02* | (2023.01) |
| *G06Q 30/0202* | (2023.01) |
| *G06Q 30/0214* | (2023.01) |
| *G06Q 30/0273* | (2023.01) |

(52) U.S. Cl.
CPC ..... *G06Q 30/0274* (2013.01); *G06Q 30/0202* (2013.01); *G06Q 30/0214* (2013.01)

(58) Field of Classification Search
CPC ........... G06Q 30/0274; G06Q 30/0202; G06Q 30/0214; G06Q 30/0254; G06Q 10/067; G06Q 30/0246
See application file for complete search history.

(56) References Cited

U.S. PATENT DOCUMENTS

| | | | | |
|---|---|---|---|---|
| 11,727,422 | B2 * | 8/2023 | Bishnoi .............. | G06Q 30/0204 |
| | | | | 705/7.33 |
| 12,094,018 | B1 * | 9/2024 | O'Malley ............ | G06Q 50/184 |
| 2010/0306161 | A1 * | 12/2010 | Chen .................. | G06Q 30/0254 |
| | | | | 705/14.54 |

(Continued)

FOREIGN PATENT DOCUMENTS

| | | | | | |
|---|---|---|---|---|---|
| WO | WO 2014/143076 | A1 * | 9/2014 | ............. | G06F 17/30 |

OTHER PUBLICATIONS

Kenteris, M; Gavalas, D; Mpitziopoulos, A.,A mobile tourism recommender system (English), The IEEE symposium on Computers and Communications (2010, pp. 840-845), Jun. 1, 2010 (Year: 2010).*

*Primary Examiner* — Marilyn G Macasiano
(74) *Attorney, Agent, or Firm* — Eversheds Sutherland (US) LLP

(57) ABSTRACT

Systems and method for real-time keywords recommendations are provided. The systems and methods leverage one or more machine learning models that receive information about events that will occur in the future. The one or more machine learning models perform parallel processing to determine, in real-time and before the events occur, different keywords that are likely to experience an increase in usage based on the events. The one or more machine learning models also determine different types of content produced by content originators that are relevant to the determined keywords. Recommendations may be made for the content (Continued)

100 originator to have an association performed between the keywords and the content. Once the associations are performed, when a consumer inputs the keyword into an application, the consumer may be presented with the content or a mechanism (such as a hyperlink, for example) by which the consumer may access the content.

17 Claims, 10 Drawing Sheets

(56)                    References Cited

U.S. PATENT DOCUMENTS

2013/0282750 A1*  10/2013  Paul ...................... G06F 16/334
                                                              707/767
2018/0152759 A1*   5/2018  Miller ................. G06F 16/2455
2022/0122118 A1*   4/2022  Domoto ................ G06Q 30/02

* cited by examiner

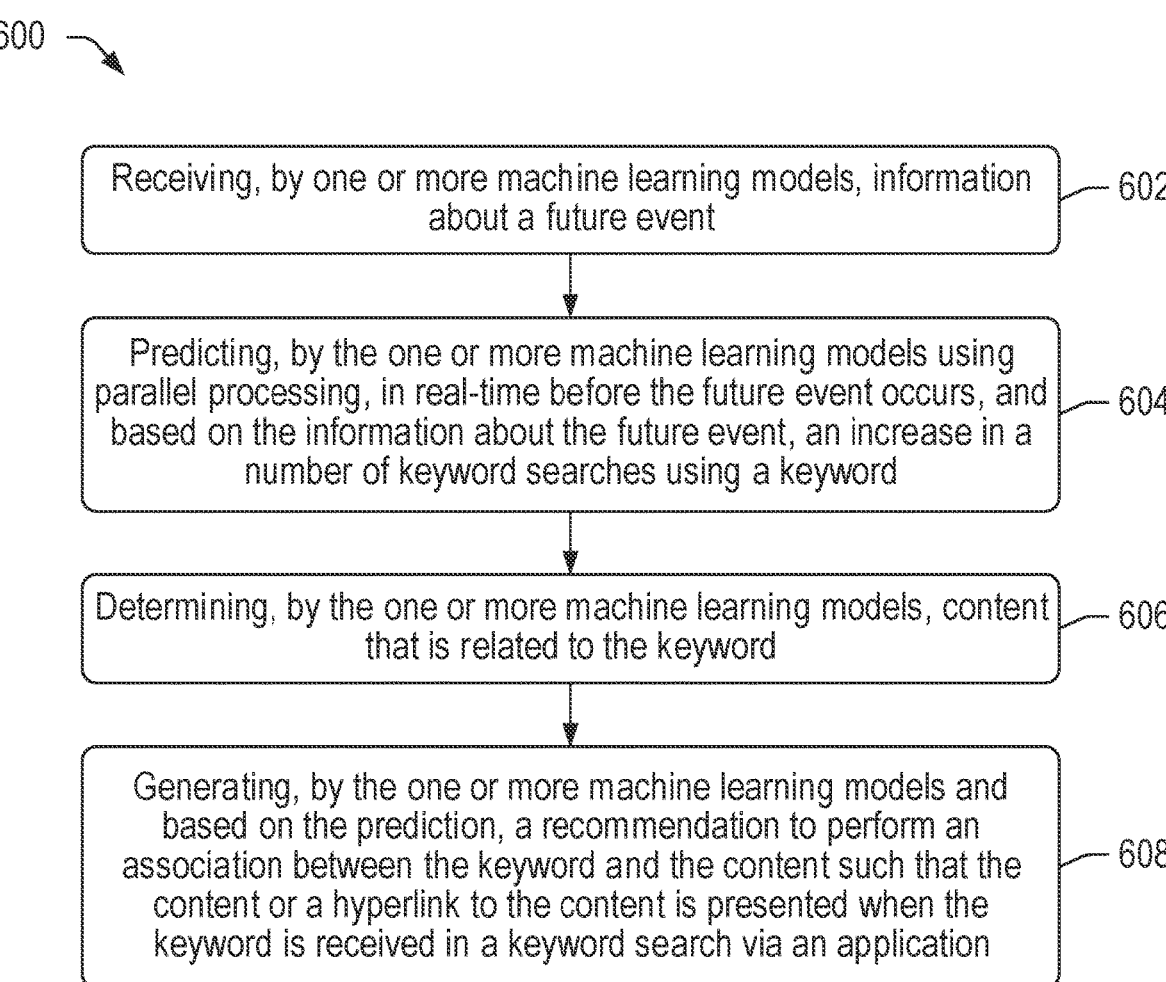

600

Receiving, by one or more machine learning models, information about a future event — 602

Predicting, by the one or more machine learning models using parallel processing, in real-time before the future event occurs, and based on the information about the future event, an increase in a number of keyword searches using a keyword — 604

Determining, by the one or more machine learning models, content that is related to the keyword — 606

Generating, by the one or more machine learning models and based on the prediction, a recommendation to perform an association between the keyword and the content such that the content or a hyperlink to the content is presented when the keyword is received in a keyword search via an application — 608

FIG. 6

SYSTEMS AND METHODS FOR REAL-TIME KEYWORD RECOMMENDATIONS

BACKGROUND

Share metrics are performance metrics that allow content originators to understand the share that their keywords fetched for the retail customer search terms when compared to similar content originators. Impression share, click share, and sales share are examples of share metrics. These metrics allow content originators to adjust their keyword bids, add new keywords based on search terms, and perform other actions to increase their share when compared to their peers.

Different types of events may impact the use of the keywords associated with the content originators. For example, an upcoming concert for a particular artist may result in an uptick in the number of keyword searches relating to merchandise for that artist. Typically, performance metrics are provided after such events occur through synchronous or asynchronous reports. Given the timing of these metrics, the content originators may often not be able to capitalize on the uptick in specific keywords searches by associating those keywords with their content.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

FIG. 6 depicts a method for real-time keyword recommendations, in accordance with one or more example embodiments of the disclosure.

DETAILED DESCRIPTION

Figure 1A:
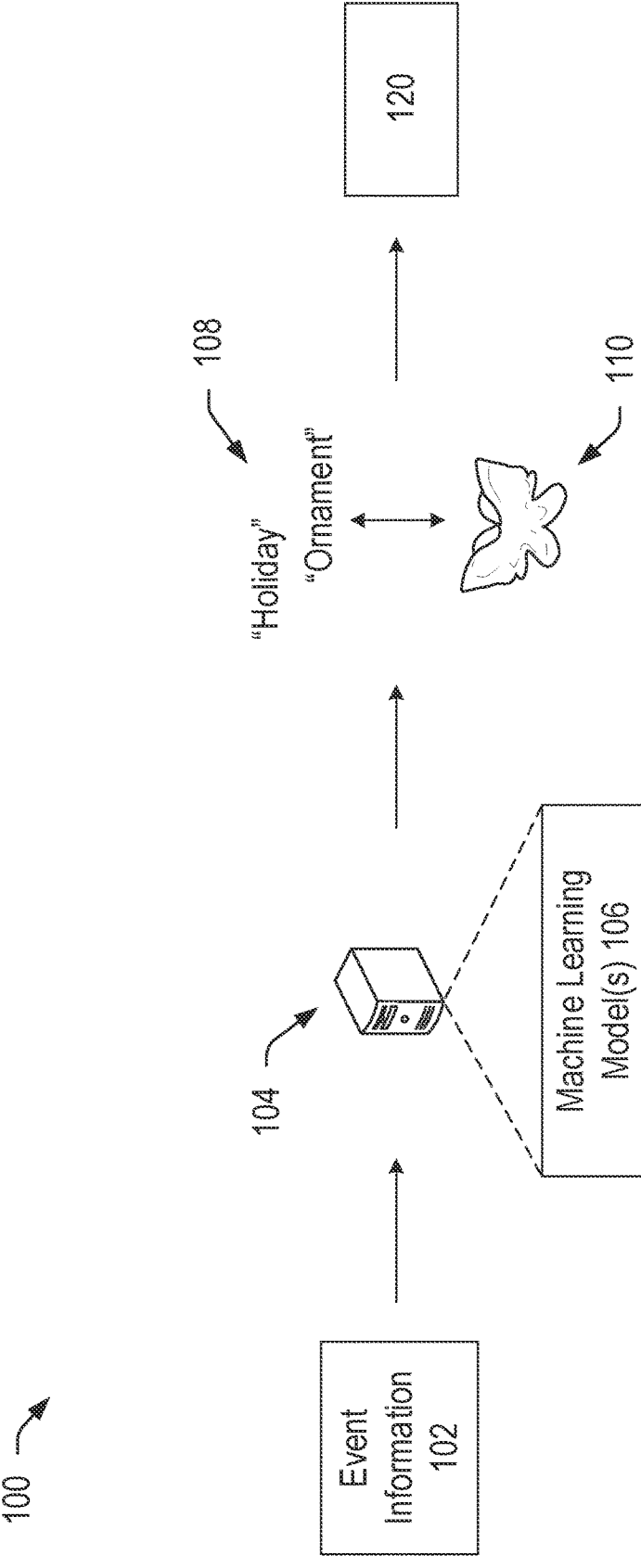
FIGS. 1A-1B depict an example of a use case for real-time keyword recommendations, in accordance with one or more example embodiments of the disclosure.

This disclosure relates to, among other things, systems and methods for real-time keyword recommendations. Content originators often desire to maximize consumer interactions with content that is accessible through an application. As used herein, a content originator may generally refer to any user or entity that generates any type of content that may be consumed by consumers. As one non-limiting example, a content originator may be a company and the content may be information presented via a website about products for sale by the company. As another non-limiting example, a content originator may be a content creator that generates videos, music, or other types of entertainment or informational content that may be consumed by consumers. As yet another non-limiting example, the content originator may be a company that offers a streaming service by which consumers may access and view live or pre-recorded video content via a video streaming platform. Any other types of users, entities, etc. that produce any other types of content (including products, as aforementioned) may also be applicable.

In some instances, consumers may access the content by providing a keyword search to an application. An application may generally refer to any type of application, such as a smartphone application, a website browser that is used to access websites via the Internet, computer software installed on a desktop or laptop computer, an application installed on a smart television, etc. These keywords may be selectively associated with different types of content such that when a particular keyword is provided to the application, the associated content (or mechanism by which the content may be accessed) may be provided back to the consumer. As one non-limiting example, a consumer may enter a search string for "skiing clothing" into a search engine via a website browser and hyperlinks to websites including content that was previously provided an association with that particular keyword may be presented to the user via the website browser. As another non-limiting example, a user may enter the search string "action movie" into a streaming service and a listing of movies that were provided an association with that keyword may be presented the consumer. Thus, it is critical for the content originators to ensure that the content that they desire to be accessed by the consumers is associated with keywords that consumers are most likely to employ when searching for content.

One challenge with determining the keywords to associate with content is that the use of particular keywords by the consumer may be dynamic. That is, the same keywords may be used more frequently by a group of consumers of an application during one period of time than another period of time based on a number of different factors. In some cases, the group of consumers may be more likely to use a particular keyword when an event is upcoming that impacts the consumers. For example, if a professional car race is upcoming within the next week, keywords related to the specific race or racing in general (e.g., team names, driver names, the name of the racing circuit, etc.) may experience an uptick.

Continuing this specific example, an entity that desires to experience additional viewer traffic and/or new user registrations to a content streaming service may desire to ensure that consumers are more likely to see the content associated with the content streaming service. That is, the entity may desire to ensure that an application to which the consumers are inputting keyword searches associates the keywords with content hosted on the content streaming service (such that when the consumers search the keywords, the application makes the content hosted on the content streaming service more readily available to the consumers than content hosted on other services). This similarly may apply to content originators that produce individual pieces of content that may be streamed via the content streaming service, rather than the entity associated with the streaming service as a whole (that is, these content originators may desire for consumers to view their content via the streaming service instead of other types of content that is also available on the streaming service). As another example, a social media influencer who desires increased traffic to a social media profile may likewise desire to ensure that the application to which the consumers are providing the keywords associates the keywords with content (e.g., videos, text-based posts, etc.) hosted on the social media influencer's social media profile.

A further challenge with dynamically performing these keywords associations with different types of content is that the associations need to be performed before the factors causing the uptick in usage of the particular keywords occur. Otherwise, if a content originator is provided a recommendation to associate certain keywords with content (or even if these associations are automatically performed), then the keyword association with the content may be performed too late for the benefits of the association to be realized (or, at a minimum, the benefits would not be maximized).

In contrast with existing keyword recommendation systems, which may only be able to provide such information about the impacts of the events on the use of the keywords by consumers after one or more events have occurred, the systems described herein are able to predict, using a combination of machine learning models, the impact the one or more events may have on consumer use of the keywords and provide real-time recommendations of keywords to associate with the content based on the predictions. Given the large amount of data that is required to be processed, it would otherwise be impossible for existing systems to provide such recommendations in real-time before the one or more events occur.

The systems and methods may not necessarily only be limited to providing keyword recommendations, but may also recommend specific types of content to present via the application at different times as well. A content originator may have a collection of different types of content that may be presented to a consumer via an application. For example, a social media influencer may have a collection of different types of videos produced by the social media influencer, however, not all of these videos may be presented on an initial page of a social media profile managed by the social media influencer. In this example, the system may provide a recommendation for one or more specific videos for the social media influencer to present on the initial page of the social media profile to improve user traffic through the social media profile. As another example, a company may have a collection of different types of products for sale, however, the website of the company may only present some of the products on a home page for the website. In this example, the system may provide a recommendation for specific products for the company to present to consumers on the home page of the website to improve overall product sales of website visitors, improve traffic through the website, etc.

Therefore, any reference to "keyword recommendations" herein is not intended to be limiting and other use cases may also be applicable.

Additionally, the systems and methods may automatically perform these dynamic changes without requiring a user selection of a change. For example, the content originator may manage a website through which consumers can access a streaming service to watch movies and television show content on the website using a web browser on their desktop computer, laptop computer, tablet, television smartphone, etc. The system may use the machine learning models to predict the types of content that consumers are more likely to desire to view at a given point on time (for example, based on upcoming events, historical viewership metrics, etc.). The system may then automatically adjust the content that is previewed to the consumers on a home page of the website. For example, if the system determines that consumers are more likely to want to watch content relating to American football when the National Football League (NFL) playoffs are upcoming (for example, documentaries about players, fictional shows involving the sport, etc.), then the system may insert such content on the home page of the website such that the consumers are more likely to see the content and potentially select the content for viewing.

In order to provide real-time keywords recommendations or automatically make dynamic keyword adjustments (for example, associate keywords with particular content), a system may need to be capable of processing an immensely large amount of data. For example, a system may be to process up to eight billion rows of data per day. If the granularity of the data is adjusted to processing hourly data, then the amount of data increased by 24 times this amount. Existing systems are not equipped to process this volume of data at the rate that is required for such real-time recommendations or automatic changes. The same applies to any other types of outputs that may be associated with these systems and methods, such as a recommendation for presenting a type of content and/or automatically enacting the recommendations. Thus, it would be impossible for existing system to provide real-time recommendations to perform automated actions in real-time as described herein.

The systems and methods described herein generally improve upon these existing systems by using multiple machine learning models to perform data processing in parallel. By performing the processing in parallel using the multiple models, the system is able to process a much larger volume of data (including data of different data types) in the same time it may take an existing system to perform the processing, allowing the system described herein to provide real-time outputs. Even if a conventional model is able to perform predictions, these predictive models are often limited to a single data type and are not able to produce such predictions in real-time given the computational complexity associated with processing large volumes of data of different data types to determine relationships between the different types of data. More specific implementation details about how the system is improved to allow for real-time recommendations and automated actions are provided with respect to at least FIGS. 2A-4.

The improved systems described herein also provide the added benefit of improving the quality of the data that is used to iteratively train the one or more machine learning models, as well as the data that is used as inputs by the one or more models to produce any of the different types of outputs described herein (for example, keywords recommendations, content recommendations, actions to be performed automatically, etc.).

The improved approaches described herein also allows for data validation to be performed in real-time as well. For example, a bot may access certain content and thus may artificially inflate the metrics associated with the number of users accessing that content (leading to data invalidity). By using parallelization to perform data validation, the data that is used by the machine learning models as described herein may be validated in real-time such that higher quality data may be provided to the machine learning models without introducing latency into the process that would prevent the machine learning models from performing the real-time predictions.

Figure 2A:
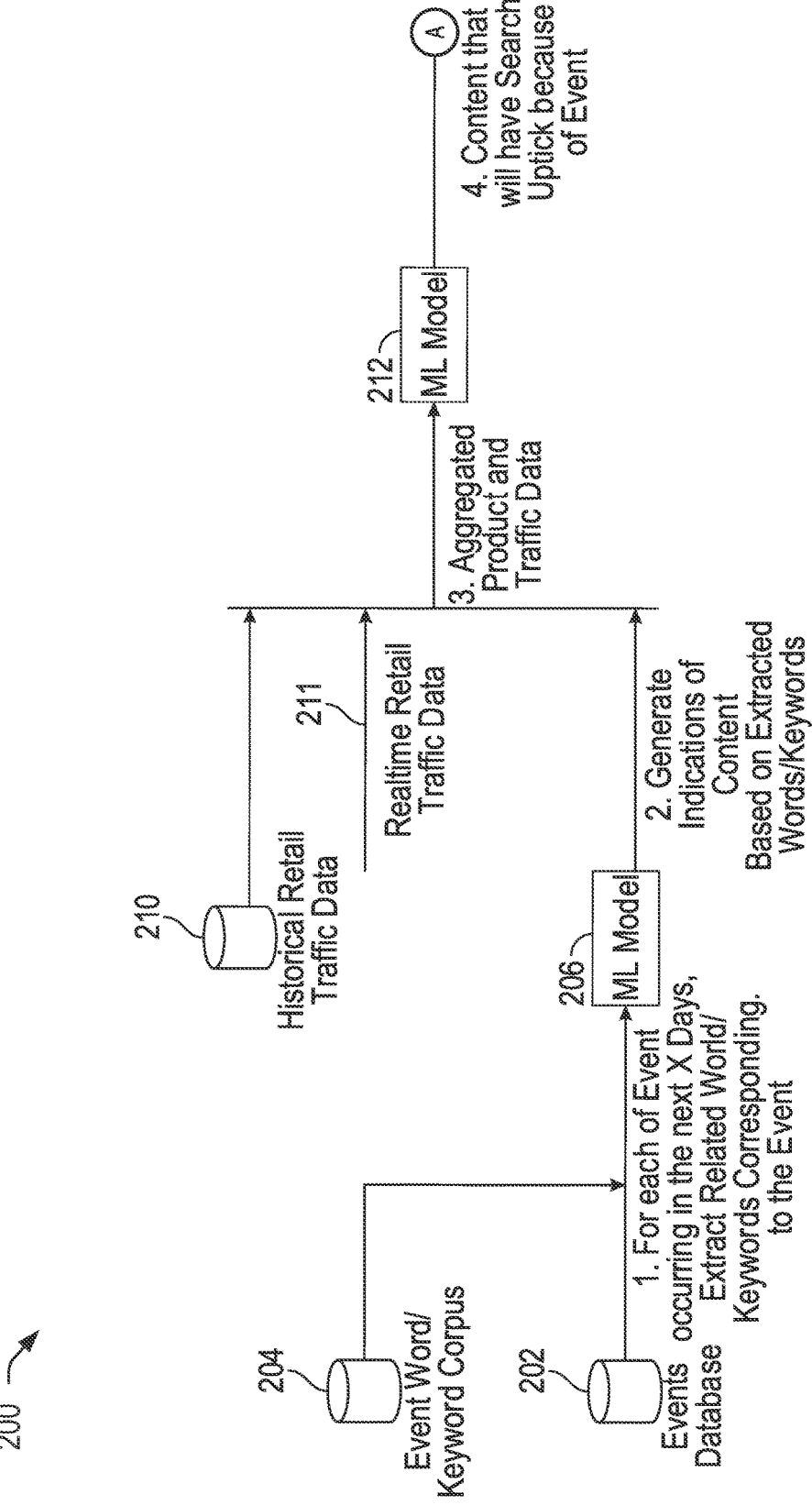
FIGS. 2A-2B depict a flow diagram for real-time keyword recommendations, in accordance with one or more example embodiments of the disclosure.
Figure 2B:
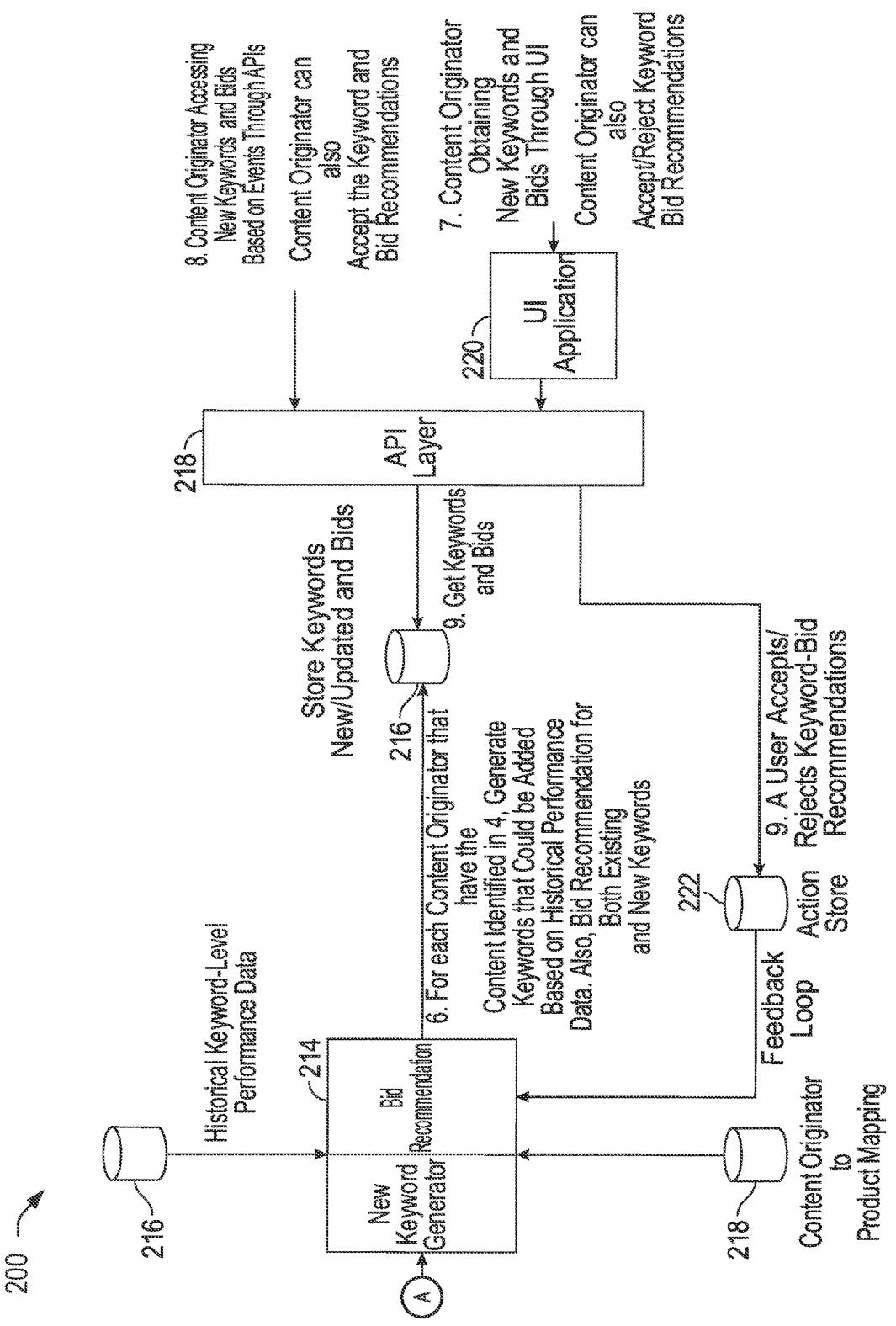
Figure 3:
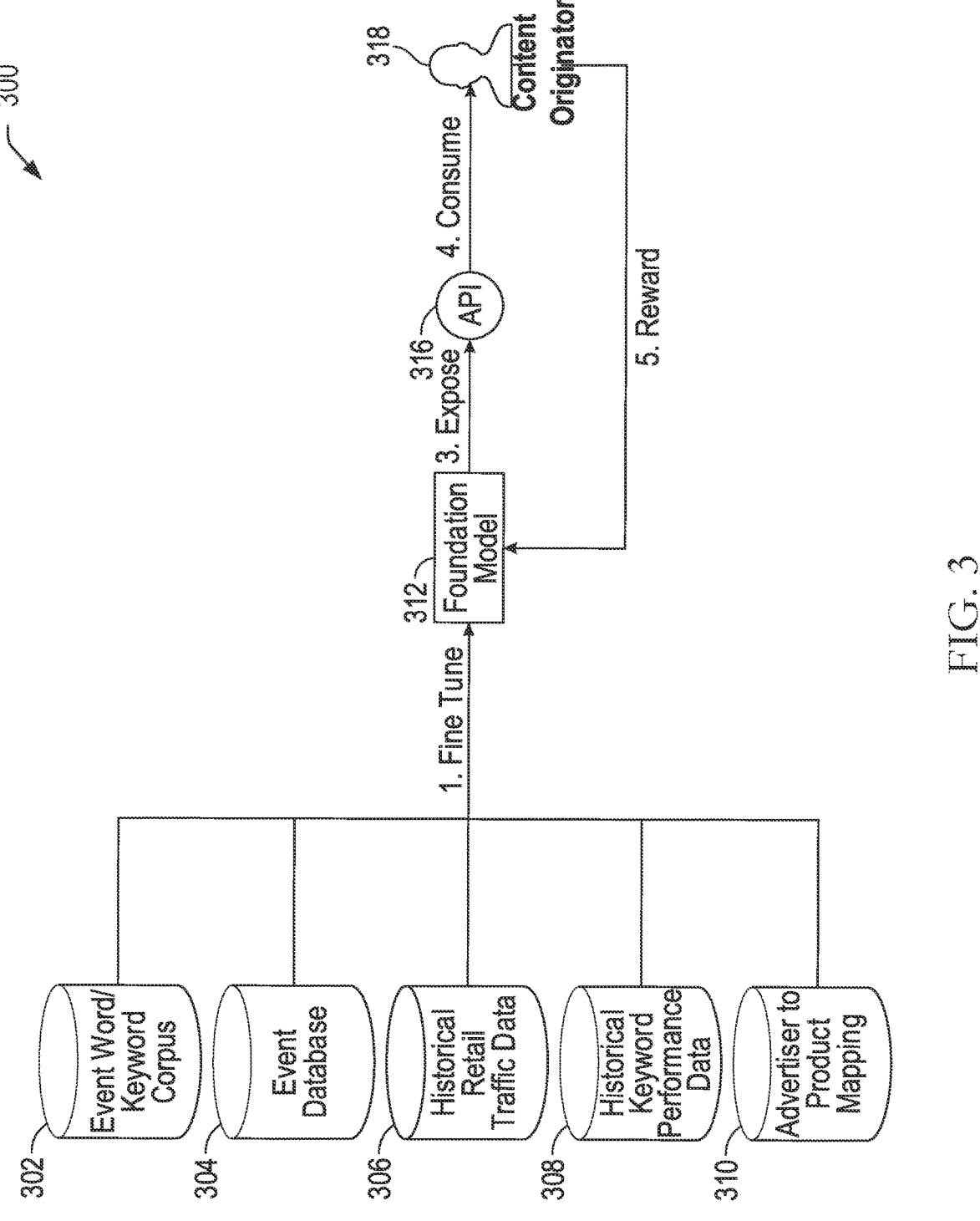
FIG. 3 depicts another flow diagram for real-time keyword recommendations, in accordance with one or more example embodiments of the disclosure.
Figure 4:
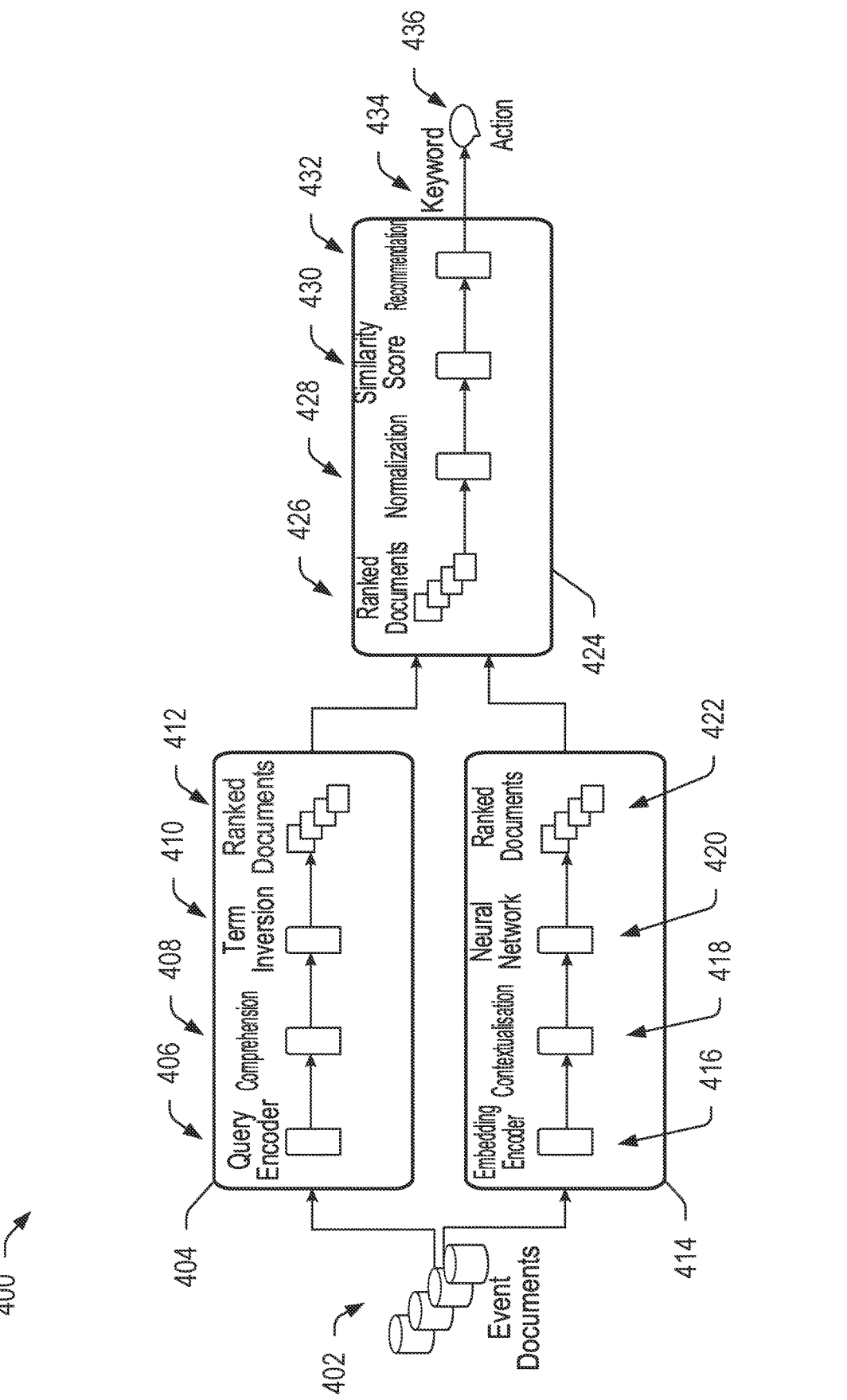
FIG. 4 depicts another flow diagram for real-time keyword recommendations, in accordance with one or more example embodiments of the disclosure.

Three different approaches for real-time keywords recommendations are described herein. FIGS. 2A-2B provide a first approach that involves the use of multiple machine learning models. FIG. 3 provides a second approach in which a single foundational model (for example, a large language model (LLM)) is trained to produce recommendations based on input prompts. FIG. 4 provides a third approach that uses multiple processing pipelines (one for dense data and one for sparse data). Further details about the three approaches are provided below.

Figure 1B:
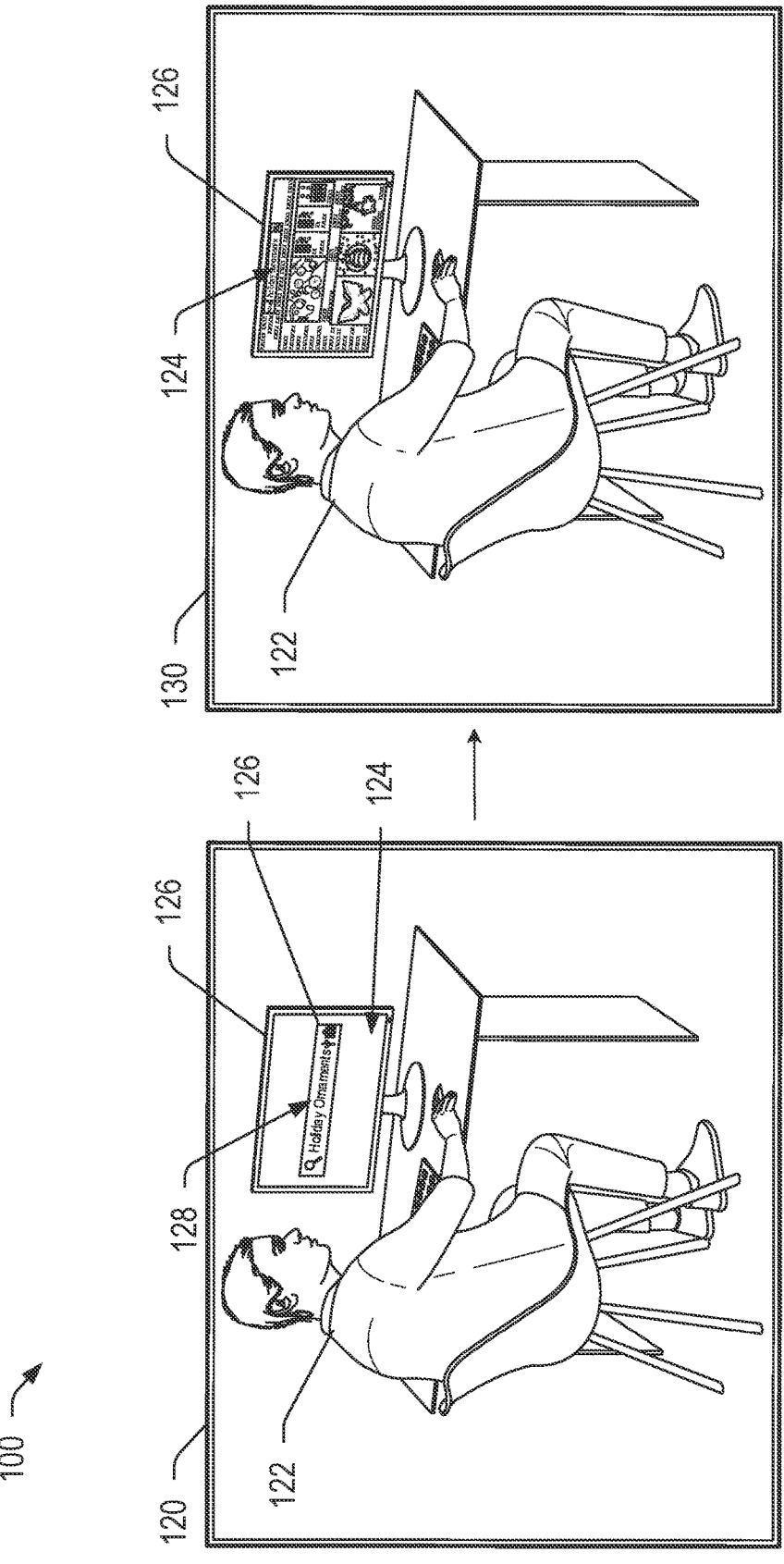

FIGS. 1A-1B depict a use case 100 for real-time keyword recommendations. The use case 100 shows an example of a manner in which a keywords recommendations are generated by one or more machine learning models 106 as described herein.

The use case 100 begins with event information 102 being provided to a system 104 hosting one or more machine learning models 106. As one specific example, the event information 102 may indicate that the winter holiday season is approaching. The one or more machine learning models 106 may use this event information 102 to predict certain keywords 108 that are likely to experience an uptick in usage during the winter holiday season. For example, consumers may access a shopping application and may enter search strings into the shopping application including keyword or a combination of different keywords. Based on the search strings, the shopping application may present a listing of relevant products for sale via a user interface. In this particular example, the one or more machine learning models 106 may predict that keywords such as "ornaments" and "holiday" or other keywords related to holiday products may experience an uptick in usage by the consumers during the winter holiday season.

Once the keywords 108 are generated by the one or more machine learning models 106, Products offered for sale via the shopping application that are relevant to the generated keywords may be identified. For example, the one or more machine learning models 106 may identify that a company sells holiday decorations 110 via the shopping application.

A determination may also be made as to whether an association between the identified products 110 and the generated keywords 108. The association may be a link within the application such that if a consumer were to enter a search string into the shopping application including any of the keywords 108, then the product 110 would be listed in the search results provided to the consumer. If the association does not exist, then the product 110 would be less likely to be returned in the search results. If it is determined that the association does not already exist, then the system 104 may recommend to the company that the association should be made such that the product 110 may experience increased visibility during the uptick in usage of the keywords 108 during the winter holiday season. These analyses and keywords recommendations based on different types of event information may be made in real-time and before the events occur such that the companies may take advantage of the predicted upcoming uptick in keywords usage before the upticks occur (otherwise, if the association between the keyword and the products is not made until the uptick is detected, it may be too late to capitalize on the uptick). In this case, the recommendation may be to associate any of the aforementioned keywords 108 with the holiday decorations products of the company.

In some instances, the recommendations may be presented to the company via a user interface (not shown in the figure). The company may indicate that they desire for the association to be performed via a selection of the recommendation. The system 104 may then perform the association between the keywords and the holiday decoration products. The association may also be automatically performed by the system 104 without requiring any manual user input as well.

Turning to FIG. 1B, two scenes are shown exemplifying the results of the association made between the generated keywords and the products as shown in FIG. 1A. In the first scene 120, a consumer 122 is shown as browsing a shopping application 124 via a desktop computer 126. While browsing, the consumer 122 enters a search string 128 into a search bar 130 of the shopping application 124. In this specific example, the search string 128 includes the keywords "holiday" and "ornaments". Following scene 120, scene 130 shows search results being presented to the consumer 122 via the shopping application 124. The search results include a listing associated with the holiday decorations product. The user may select the listing via the shopping application 124 and the shopping application 124 may then navigate to a page including information about the product and the option to purchase the product.

Although the use case 100 shows the content originator as being a company and the content as being a product for sale, this is merely an example to illustrate the use of the machine learning models as described herein. Any other types of content originators and content may also be applicable as well. Further, the application may not necessarily be limited to a shopping application and any other type of application may also be applicable.

FIGS. 2A-2B depict a flow diagram 200 for real-time keyword recommendations. Particularly, the flow diagram 200 represents the first approach for real-time keyword recommendations.

The flow diagram 200 begins with first data from a first data store 202 and second data from a second data store 204 being provided to a first machine learning model 206. The first data store 202 and the second data store 204 may be databases, for example, however, may also be any other type of storage mechanism as well. The first data may include information pertaining to different events that are scheduled to occur at some point in the future. The events may include any number of different types of events, such as sporting events, holidays, concerts, product releases, music album, television series, or movie releases, music, movie, and/or television award shows, political elections, and/or any other type of events. Such events may have an impact on the manner in which consumers search for and interact with different types of content. As one example, when the U.S. Open tennis tournament is ongoing, an uptick of keyword searches for names of players may be experienced by a web-based search engine. As another example, when a new children's toy is scheduled to be released around a holiday, an uptick of keywords searches for the name of the toy may be experienced by the web-based search engine (reference to the web-based search engine is merely exemplary). Thus, the listing of the events that are going to occur in the future may be maintained in the first data store 202 for use by the first machine learning model 206 (and the second machine learning model 212 as described below) in generating outputs, such as keyword recommendations, content recommendations, automated actions to take based on the recommendations, etc.

Any of the input information that is received (for example, information about events, keywords, and/or any other types of input information) in a natural language format may undergo a translation process. For example, the input information may be translated from one language to another language. This translation may be performed by the one or more models themselves and/or may be performed before being received by the one or more models. The models may also have the capability to understand the context associated with a natural language input as different words may have different meaning in different languages. This translation and context understanding may be applicable to any models described herein in association with any of the approaches.

In embodiments, the first data store 202 may only store events that are going to occur within a given period of time in the future rather than storing all of the events that are known to be occurring at any point in the future. For example, a sports event that is scheduled to take place ten years in the future may have a negligible impact on current consumer habits, so this event may not be stored in the first data store 202. However, in other embodiments, the first data store 202 may store all known upcoming events, regardless of the amount of time in the future the events are scheduled to occur, however, the data that is provided by the first machine learning model 206 may be filtered to only include events that are scheduled to occur within the given period of time. In both instances, the amount of data that is processed by the machine learning model 206 model is reduced, thereby reducing the amount of time required for the machine learning model 206 to generate outputs. The second data may include listings of different types of keywords that are typically associated with a particular type of event, as well as any other types of relevant data.

Using the extracted keywords associated with the events obtained from the first data source 202 and the second data source 204, the first machine learning model 206 may generate indications of content related to the keywords. For example, the first machine learning model 206 may be a neural network, such as word2vec, zero-shot learning, generative artificial intelligence, a foundational model, and/or any other type of model trained using existing content to generate indications of content based on the keywords.

Once the indications of the content are generated by the first machine learning model 206, historical and real-time application traffic may be provided to a second machine learning model 212. For example, the historical application traffic may be stored in a third data store 210 and the real-time application traffic may be obtained from an application experiencing the consumer traffic (or any other data source in which this data is temporarily or permanently stored). The second machine learning model 212 predicts whether increased consumer interaction is anticipated for certain content. For example, the second machine learning model 212 may predict if there is going to be an uptick in the use of a particular keyword based on an upcoming event (along with the other historical and real-time data provided to the second machine learning model 212). The second machine learning model 212 may associate upcoming events and past historical application traffic data along with the current application traffic data and predict trends for the content. If a predicted value (for example, the predicted value may be a numerical value indicating a number of keyword searches, a number of views of the content, and/or any other metrics that may be tracked using a numerical value) is above an average value for a given period of time (for example, attributable to an event), then this content may be selected for the next portion of the flow diagram 200.

In embodiments, a time series forecast algorithms may be employed as the second machine learning model 212. Time series forecasting is a method by which future values may be predicted over a period of time based on historical data. Examples of such models may include prophet, auto regressive integrated moving average, exponential smoothing, lightGBM, or XGBoost, etc. may also be employed. However, time series forecasting is merely one example implementation of the second machine learning model 212 and other types of models may also be used.

The output of the second machine learning model 212 may be provided to a third machine learning model 214. In embodiments, the third machine learning model 214 may be a deep learning model, however, other types of models may also be used. In addition, historical data relating to keyword performance may be provided to the third machine learning model 214 from a fourth data store 216 and associations between content originators and content may be provided to the third machine learning model 214 from a fifth data store 218.

The historical data relating to keyword performance may include metrics indicating the number of times a particular keyword or keywords were used over given periods of time. For example, the data may indicate that the keyword "Roger Federer" was searched in a web-based search engine 100,000 times over a particular week-long time frame. This period of time is merely exemplary and may also include any other time period as well. Additionally, in some instances, this data may also provide an indication of events that occurred during those time periods. For example, the data may also indicate that the U.S. Open was ongoing during that particular week-long time frame.

The associations between content originators and content may include a listing of different content that is associated with each of the content originators that access the system as described herein. For example, a social media influencer may have a collection of videos stored in a database and accessible by consumers for viewing via a video streaming website. As another example, a tennis equipment company may own a collection of tennis products for sale and an indication of these products may be stored in the fifth data store 218.

Using all of this information, the third machine learning model 214 may determine all of the content originators that are associated with the content that was indicated by the second machine learning model 212. For example, the second machine learning model 212 may generate an output indicating that videos including tennis content may experience an uptick in consumer interaction. As another example, the second machine learning model 212 may generate an output indicating that a particular brand of tennis racquet may experience an uptick in consumer interest and/or purchases. The third machine learning model 214 may then use these outputs and determine that the aforementioned social media influencer has stored videos relating to tennis and the tennis equipment company has tennis racquets for sale in their product listing.

Once the third machine learning model 214 identifies the content originators that are associated with the content output by the second machine learning model 212, the third machine learning model 214 may then generate recommendations for the content originators to implement. For example, the third machine learning model 214 may generate indications of keywords that the content originators may associate with the content to ensure maximum consumer interaction with the content.

The third machine learning model 214 may also retrieve information about current keywords that the content originators have associated with the content. If an association between a keywords output by the third machine learning model 214 and the content of the content originator already exists, then the third machine learning model 214 may not need to provide the recommendation for the keyword to that particular content originator. However, the third machine learning model 214 may, in some cases, still provide an indication that maintaining the keyword association would be beneficial for the content originator for the period of time associated with the event that is predicted to cause an uptick in the usage of the keyword. If the third machine learning model 214 determines that an association between the keyword and the content of the content originator does not currently exist, then the third machine learning model 214 may output a recommendation for the association to be made (such that when a consumer inputs the keywords into an application, the content of the content originator is more likely to be provided to, or accessible by, the consumer via the application).

Similarly, the third machine learning model 214 may provide output recommendations other than keywords as well. For example, the third machine learning model 214 may produce the same output as the second machine learning model 214 (or the output of the second machine learning model 212 itself may be provided as the output of the overall system). That is, instead of providing a keyword recommendation to a content originator, the third machine learning model 214 (or the second machine learning model 212) may provide an indication of content that is likely to be associated with an increase in consumer demand during a given period of time (for example, based on an upcoming event and/or any other factors). As aforementioned, for example, a social media influencer may have a collection of different types of videos produced by the social media influencer, however, not all of these videos may be presented on an initial page of a social media profile managed by the social media influencer. In this example, the system may provide a recommendation for one or more specific videos for the social media influencer to present on the initial page of the social media profile to improve user traffic through the social media profile. As another example, a company may have a collection of different types of products for sale, however, the website of the company may only present some of the products on a home page for the website. In this example, the system may provide a recommendation for specific products for the company to present to consumers on the home page of the website to improve overall product sales of website visitors, improve traffic through the website, etc.

Additionally, in some cases, an action or actions may automatically be performed based on the output of the third machine learning model 214. That is, rather than only providing a recommendation for a keywords association with particular content, a recommendation to make particular content more readily available, and/or any other recommendations, the system may instead automatically perform an action or actions to satisfy the recommendations. For example, the system may automatically perform the association between the keyword and the content of the content originating such that when a consumer inputs the keyword into an application, the content of the content originator is provided to, or made accessible by, the consumer. Similarly, the system may automatically modify the presentation of the content such that it is more readily accessible by the consumers. For example, if the content is presented on a website that is accessible by a consumer via a web browser, the system may modify a home page of the website to include the content such that the content is more likely to be viewed by the consumer when the consumer accesses the website. These are merely examples of different types of automated actions that may be performed and any other types of actions may also be performed as well.

In embodiments, a system that implements an (ETL) process may be used instead of the third machine learning model 214. This can be an ETL that extracts high-performing keywords for each of the types of content based on historical performance. In further embodiments, a combination of a system implementing an ETL and a machine learning model may be used to provide an aggregated set of keywords generated by the ETL (which uses data from historical searches and content performance) and the machine learning model.

Any of the machine learning models may also be iteratively trained and re-trained. For example, if the third machine learning model 214 produces an output including a recommendation for a keyword, the content originator may indicate through a user interface that they desire for the recommendation to be implemented. An indication of the selection of the recommendation by the content originator may be provided back to any of the machine learning models in a feedback loop and used to re-train the machine learning model to further improve the accuracy of future outputs. Any other types of data may also be provided back to the machine learning models through the feedback loop for purposes of re-training. Other non-limiting examples of such data may include the performance of the keyword, such as a number of times the keyword was provided by consumers in a given period of time. Similarly types of metrics may also be obtained for other types of outputs, such as an indication of a number of views of video content, a number of product purchases, etc.

The output of the third machine learning model 214 may be stored in a fifth data store 216. A content originator may access the outputs of the third machine learning model 214 stored in the fifth data store 216 via a user interface of an application 220. The application 220 may call an application programming interface (API) that may provide access to the data stored within the fifth data store 216. In this manner, the content originator may be presented with the information stored in the fifth data store 216 via the user interface of the application 220. For example, the content originator may view keyword recommendations provided by the third machine learning model 214 based on an upcoming event. The user interface of the application 220 may also allow the content originator to select a particular recommendation to be enacted. For example, the content originator may select a recommendation to associate a keyword with content of the content originator. The system may then automatically perform the association based on the selection. In embodiments, actions to be performed by the system based on the selections by the content originator may also be stored within a sixth data store 222 and may be performed at a designated time in the future.

While reference is made to various individual data stores, any other number of data stores may also be used. For example, all of the information may be stored in the same data store or a smaller number of data stores than the number of data stores shown in FIGS. 2A-2B.

FIG. 3 depicts another flow diagram 300 for real-time keyword recommendations. Particularly, the flow diagram 300 represents the second approach for real-time keyword recommendations. Particularly, the second approach may include fine tuning a foundation model 312, such as a large language model (LLM) to produce similar types of outputs as the one or more models illustrated in FIGS. 2A-2B. Fine tuning is a supervised learning process in which a dataset of labeled examples are used to update the weights of the foundation model to improve the ability of the model to perform certain tasks. A foundation model is a type of transformer model, which is a type of neural network that learns context and thus meaning by tracking relationships in sequential data.

In embodiments, the foundation model 312 may be trained using data from multiple data sources for example, the data sources may include a first data store 302, second data store 304, third data store 306, fourth data store 308, and fifth data store 310. However, any other number of data sources may also be used to train the foundation model 312.

The data included in the first data store 302, second data store 304, third data store 306, fourth data store 308, and fifth data store 310 may be the same as, or similar to, the data included in the data stores depicted in FIGS. 2A-2B. For example, the first data store 302 may be equivalent to the second data store 204, the second data store 304 may be equivalent to the first data store 202, the third data store 306 may be equivalent to the third data store 210, the fourth data store may be equivalent to the fourth data store 216, and the fifth data store 310 may be equivalent to the fifth data store 218.

Once the foundation model 312 is trained, the foundation model 312 may then begin to produce outputs based on text based prompts provided to the foundation model 312 as inputs. In some instances, these text-based prompts may be manually generated and provided to the foundation model 312 by a user 314. For example, the user 314 may be a content originator providing a prompt requesting for the foundation 312 model to produce keywords that are recommended to associate with content of the content originator (as well as text-based requests for other types of information). Based on this prompt, the foundation model 312 may then output a recommendation or may cause an automated action to be taken in a manner similar to the output of the one or more machine learning models illustrated in FIGS. 2A-2B. Any other type of user 314 may also provide these prompts as well.

This second approach may not necessarily require the prompts to be provided to the foundation model 312 by a user 314. For example, the prompts may instead be automatically produced and provided to the foundation model 312. For example, another model or any other system, device, etc. may produce the prompts and provide the prompts as inputs to cause the foundation model 312 to produce any of the outputs it may otherwise have produced given manual inputs from the user 314.

In some instances, this data that is used to train the foundation model 312 may be originally stored within cells within a database (that is, the data may be tabular data that is stored within rows and columns of a database). However, the foundation model 312 may not be able to process data that is provided in this format. Accordingly, the training may need to be converted into a text format before being provided to the foundation model 312 for training. For example, a database may include columns for type of content, indications of events that occurred in the past, and a number of times a particular keyword was used to search for the content at the time of the event. This data may be converted into a text prompt stating, for example, "users searched for content X using keyword Y 1,000 times during event Z." This text-based prompt may then be provided to the foundation model 312 rather than the data in the format in which the data was originally stored in the database.

This transformation may also be performed on any other information that is provided to the foundation model 312. For example, the prompts may be automatically provided based on an input of a content creator to an application (such as application 220 or any other application described herein) indicating that the content creator desires for the application to provide general recommendations for keywords and/or content to make more accessible to consumers. That is, rather than the content originator providing a prompt directly to the foundation model 312, the content originator may simply request this information and then the system may generate the prompt that is provided to the foundation model 312 to provide this information back to the content originator via the application.

As another example, prompts for the foundation model 312 to produce keyword and/or content recommendations may be provided to the foundation model 312 on a periodic basis. That is, the triggering condition for prompting the foundation model 312 may be that a particular amount of time has passed. In this manner, the foundation model 312 may periodically update its keyword and/or content recommendations. This information may then be stored in a data store and automatically provided to the content originator or may be provided upon request from the content originator. That is, the foundation model 312 may generate the recommendations before the content originator requests the recommendations and the stored recommendations may be provided to the content originator rather than the foundation model 312 needing to generate the recommendations when the content originator requests them.

As yet another example, the prompts may be provided to the foundation model 312 when a new event is determined to be occurring within a given period of time. In such cases, the prompts may be tailored specifically to that event. For example, the prompt may indicate for the foundation model 312 to provide keywords and/or content recommendations given that a sports event is occurring in the next week.

The outputs generated by the foundation model 312 may be exposed to a user via an application programming interface (API) call made by an application (such as the application 220 or any other application described herein) accessed by the user. For example, the recommendation to associate content with a keyword or present the content may be provided to the user via the application. The user may then indicate if they desire for the recommendation to be enacted and the user may either manually perform the recommended action or may indicate that the system should perform the action (and the system may then act accordingly). A reward function may be used to re-train the foundation model 312 based on the user actions to improve the performance of the foundation model 312 over time.

FIG. 4 depicts another flow diagram 400 for real-time keyword recommendations. Particularly, the flow diagram 400 represents the third approach for real-time keyword recommendations. Conventionally, a single data processing pipeline is used. In contrast, in the third approach shown in FIG. 4, two data processing pipelines are used in parallel. Specifically, a dense pipeline 404 processes dense vectors (for example, vectors including information about existing content) using a less detailed similarity analysis, such as term frequency inversion. A separate sparse pipeline 414 that is used for keywords analysis. Keywords are more dynamic and can take multiple forms of meaning. Thus, the computational resources are allocated more heavily in favor of the more computationally-intensive keywords analysis. The result of this is a pre-ranked list (for example, ranked documents 426) of sub-categories within the event corpus of the event documents 402. This pre-ranked list provides a closer similarity between content and keywords as they relate to the largest event corpus of the original events documents 402. This approach significantly reduces the latency associated with performing the keyword predictions, allowing recommendations (and automated actions based on the recommendations) to be performed in real-time.

A content originator's ability to improve their targeted keyword effectiveness may have similar derivatives that are clustered in the n-dimensional vector embedding taxonomy of the event language corpus. Furthermore, content associated with a collection of keywords may be represented as a query similarity vector against the event sample space to optimize the derived targeted keywords positive predicted value and sensitivity. To enable a content originator's content and keyword to achieve the closest similarity with a generated search term that is optimized for an event corpus, the system tokenizes the content and keywords into an n-dimensional vector using an encoder to resolve bidirectional self-attention and comprehension model weights.

The system that allows an content originator to infer an optimized targeted search term using the existing content and keywords may iterate through the periodically time sequenced event corpus to determine contextual similarity learning and relationships, which impacts latency and the content originator experience. To achieve increased inference performance, the system first retrieves ranked event documents (for example, ranked documents 412 and 422 which are combined to form ranked documents 426) from the larger event corpus that have the highest similarity probability distributions for an content originator's content and keyword. Having event documents pre-ranked bounds latencies at less than 100 ms (for example) over iterating through the entire event corpus. From the retrieved document subset, an augmented generative 424 learns contextual relationships at the document level which have been preselected from the content and keyword retrieval transformer.

Beginning with the dense pipeline 404, information about existing content is processed to identify the existing content associated with different content originators that is most relevant to the event information included in the event documents 402 (documents that include information about future events, for example). To achieve event preselection and similarity for a content originator's content, the content may be transformed into vector and positional embeddings using an encoder 406 to fine tune the in-domain content originator and event language model and classification layers. The content vector may be represented as a sparse query filter and use term frequency inversion 410 in the event language corpus to establish event relevance and similarity. The correlation between the content vector(s) and event language may be determined by the inner product of the sparse vectors and may rank each event corpus using dynamic cutoff from the predicted probability distributions. These rankings are shown as ranked documents 412. A 90% probability mass may be modeled when ranking the event datasets as an outcome to the content vector similar scores to ensure sampling is bounded by the cumulative sum of the probability masses. Furthermore, the system optimizes for content coherency and diversity by rescaling the content sampling logits prior to taking the probability softmax, which tunes the token probabilities to achieve the intended content selection distribution.

Turning to the sparse pipeline 414, similar to the content vector that has been transformed into a sparse query filter, the content originator's target keywords associated with the content may also be encoded (for example, using embedding encoder 416) to achieve bidirectional self-attention with the event corpus and select a subset of event documents that maximizes the similarity distribution to the source keyword. The event retriever may be based on a dense vector encoder that contextualizes the keyword and documents and embeds semantic heuristics with meaning into the n-dimensional keyword vector space. The learned contextual relationship between keyword and document enables the dense retriever to use the highest similarity attention weights in selecting the most relevant documents and transfer the learned weights to other content originator domain adaptions that have unique content and keyword fabrics. The contextualization 418 may involve performing multi-head attention on the keyword strings. A neural network 420 may be used to perform prediction of similar keywords.

The event documents produced and ranked by the sparse content and dense keyword contextualized query filters are then provided to a parametric augmented generator 424 that optimizes keyword inference. The generators sliding window and document stride ensure that the attention score coverage and weighted sum of the similarity value matrices determined at a similarity score step 430 have contextualized representations for every keyword in the input embedding. The generator also applies a normalization function 428 to both the keyword label and inferred keyword prediction to remove context ambiguity and increase the harmonic mean during the tokenization and encoding feed forward network. The content and keyword retriever filters and generator are provided into a pipeline so that the components can operate as a graph for customized use cases and performance evaluation. The generator is then pretrained on the event corpus as a sequence to sequence transformer to receive event documents as latent vectors from the sparse and dense retrievers, and be used to infer new keywords based on any given event context and an content originator's search term attribute.

The output of the flow diagram 400 is a recommendation 434 for a content originator to perform an association between a particular keyword or keywords and certain content. An action 436 may also be taken based on the recommendation 434. For example, the content originator may indicate that the association should be performed and then the system may perform the association. The association may also be automatically performed in some instances as well.

Figure 5:
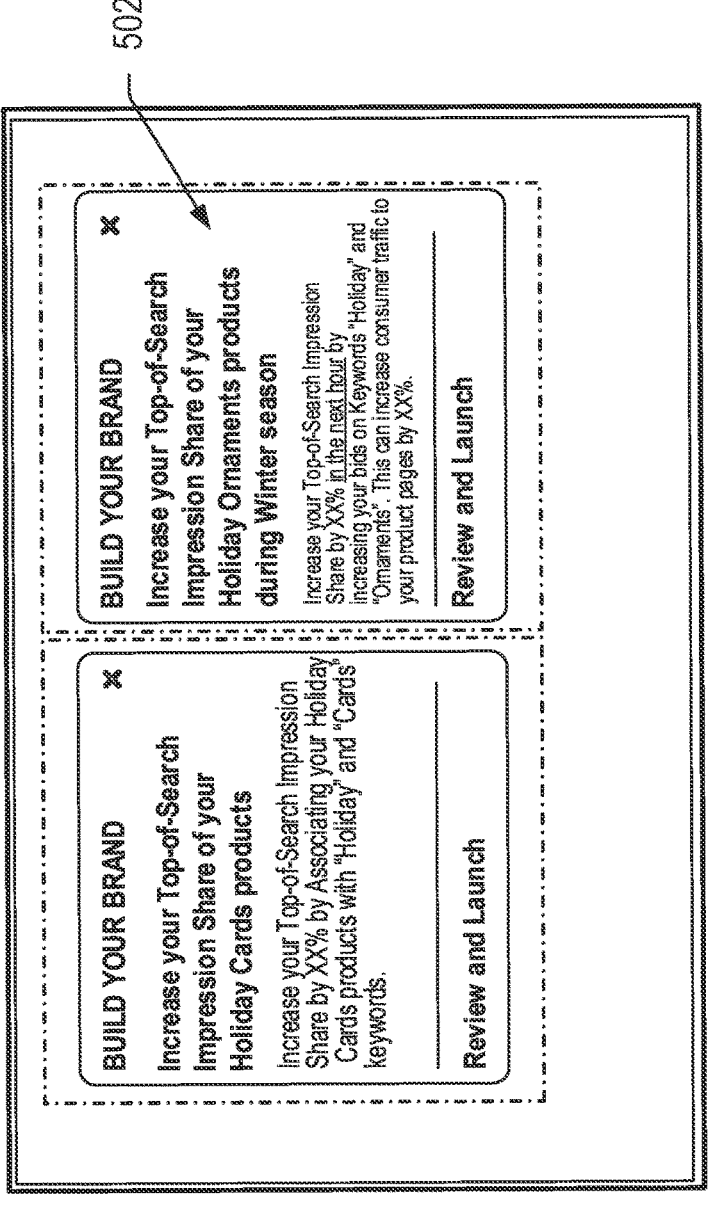
FIG. 5 depicts a user interface, in accordance with one or more example embodiments of the disclosure.

FIG. 5 depicts an exemplary user interface 500 of an application (for example, application 220 or any other application described herein) that may be accessed by a content originator. The user interface 500 shows examples of different recommendations that may be made to a content originator that is a company that sells products. The user interface 500 shows two different recommendations from which the company may select. For example, the user may select a second recommendation 502 to perform an association between the keywords "holiday" and "ornament" and products listed for sale by the company.

FIG. 6 depicts an example method 600 for real-time keyword recommendations. Some or all of the blocks of the process flows or methods in this disclosure may be performed in a distributed manner across any number of devices or systems (for example, system 104, computing devices 702 and 706, user device 712, computing device 800, any of the models described herein, etc.). The operations of the method 600 may be optional and may be performed in a different order.

At block 602 of the method 600, computer-executable instructions stored on a memory of a system or device may be executed to receive, by one or more machine learning models, information about a future event.

At block 604 of the method 600, computer-executable instructions stored on a memory of a system or device may be executed to predict, by the one or more machine learning models using parallel processing, in real-time before the future event occurs, and based on the information about the future event, an increase in a number of keyword searches using a keyword.

At block 606 of the method 600, computer-executable instructions stored on a memory of a system or device may be executed to determine, by the one or more machine learning models, content that is related to the keyword.

At block 608 of the method 600, computer-executable instructions stored on a memory of a system or device may be executed to generate, by the one or more machine learning models and based on the prediction, a recommendation to perform an association between the keyword and the content such that the content or a hyperlink to the content is presented when the keyword is received in a keyword search via an application.

Figure 7:
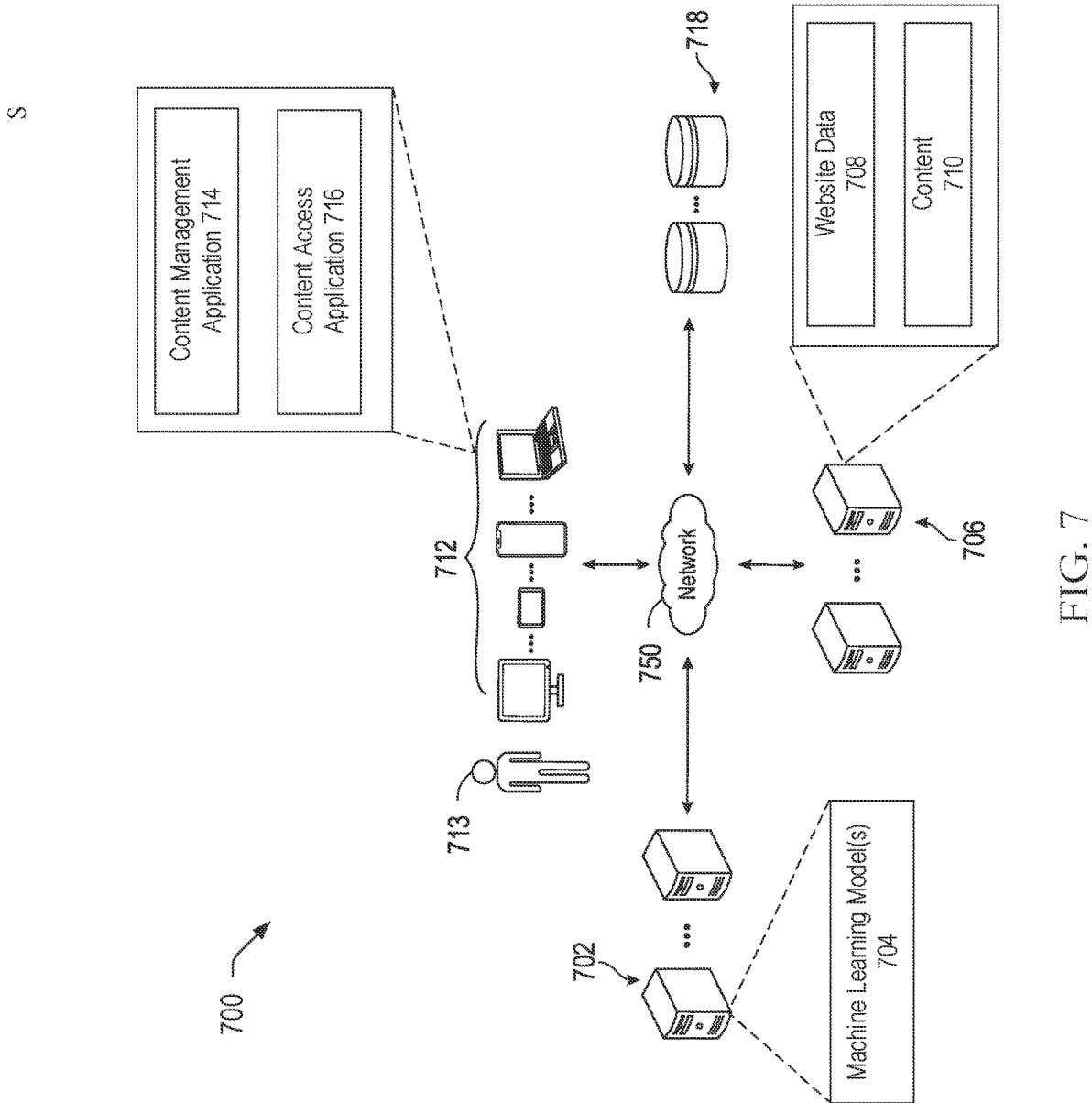
FIG. 7 depicts an example system for real-time keyword recommendations, in accordance with one or more example embodiments of the disclosure.

FIG. 7 is an example system 700 for generating real-time keywords recommendations. In one or more embodiments, the system may include, one or more computing systems 702 and 706, one or more user systems 712 (which may be associated with one or more users 713), and/or one or more databases 718. However, these components of the system 700 are merely exemplary and are not intended to be limiting in any way. For simplicity, reference may be made hereinafter to, computing system 702, computing system 706, user device 712, database 718, etc., however, this is not intended to be limiting and may still refer to any number of such elements.

The computing systems 702 and 706 may be remote systems, such as remote servers, for example. The computing system 702 may host any of the machine learning model(s) 704 that are used to produce keyword or other types of recommendations as described herein (for example, in accordance with any of the approaches described with respect to FIGS. 2A-4).

The computing system 706 may host data associated with the content that is accessed by the user 713. At a specific example shown in FIG. 7, the computing system 706 may be a remote server that hosts website data 708 associated with a website that is accessible by the user 713 via the user device 712. The computing system 706 may also host the contest 710 that may be presented to the user 713 via the website. As a non-limiting example, the website data 708 may be associated with a content streaming platform and the content 710 may be movies or television shows available to the user 713 for viewing via the content streaming platform. As another example, the website data 708 may be associated with a website of a company and the content 710 may be information about products offered for sale by the company via the website. As described herein, any other types of content may also be applicable. Additionally, while reference is made to website data 708, the user 713 may not necessarily be accessing a website. For example, the content 710 may be provided directly to the user 713 via a content access application 716 without the use of a website as well. Therefore, the website data 708 shown in the figure is not intended to limit the scope of the content 710.

The user device 712 may be any type of device, such as a smartphone, desktop computer, laptop computer, tablet, smart television (for example, a television with Internet connectivity, the capability to install applications, etc.), and/or any other type of device. The user device 712 may include various applications that may allow the user 713 to perform different types of operations as described herein.

In some cases, the user 713 may be a person accessing content produced by a content originator. The content access application 716 may be provided via the user device 712 that allows the user 713 to access and view different types of content 710. As a non-limiting example, the user 713 may desire to view a movie via their laptop computer. In this specific example, the user 713 may open the content access application 716 (in this case, the content access application 716 may be a web browser) using the user device 712 and may navigate to a website associated with a content streaming platform via the content access application 716. The website may be presented to the user 713 based on the website data 708 hosted at the computing system 706. The user 713 may enter a keyword representing a search string into the website to view movie recommendations produced by the content streaming platform.

As aforementioned, the content access application 716 is not necessarily limited to a website browser, however, any may also be any other type of application (e.g., software installed on a desktop or laptop computer, a standalone application provided a smart television, a standalone application provided on a smartphone, etc. Additionally, the use case of the user 713 accessing a content streaming platform is merely exemplary and any other types of content as described herein or otherwise may similarly be applicable.

The user 713 may also be a content originator that produces the content that is viewed by a user accessing the content. In such cases, the user device 712 may also include a content management application 714. The content management application 714 may provide a user interface (a simplified example of information that may be presented via the user interface is shown in FIG. 5) via which keywords recommendations (and/or other types of recommendations as described herein) may be presented to the user 702. In scenarios where actions are automatically taken based on recommendations identified by the one or more machine learning model(s) 710, an indication of such actions may be presented to the user 702 via the content management application 704.

The database 710 may store any of the data that is used as described herein. For example, the database 718 may store any of the information described as being stored in any of the data stores of FIGS. 2A-2B, 3, 4, as well as any other data described herein.

In one or more embodiments, any of the elements of the system 700 (for example, one or more computing devices 702 and 706, one or more user devices 712, one or more databases 718, and/or any other element described with respect to FIG. 7 or otherwise) may be configured to communicate via a communications network 750. The communications network 750 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 750 may have any suitable communication range associated therewith and may include, for example, global networks (e.g., the Internet), metropolitan area networks (MANs), wide area networks (WANs), local area networks (LANs), or personal area networks (PANs). In addition, communications network 750 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, one or more computing devices 702 and 706, one or more user devices 712, one or more databases 718) of the system 700 may include any of the elements of the computing device 800 as well (such as the processor 802, memory 804, etc.).

Figure 8:
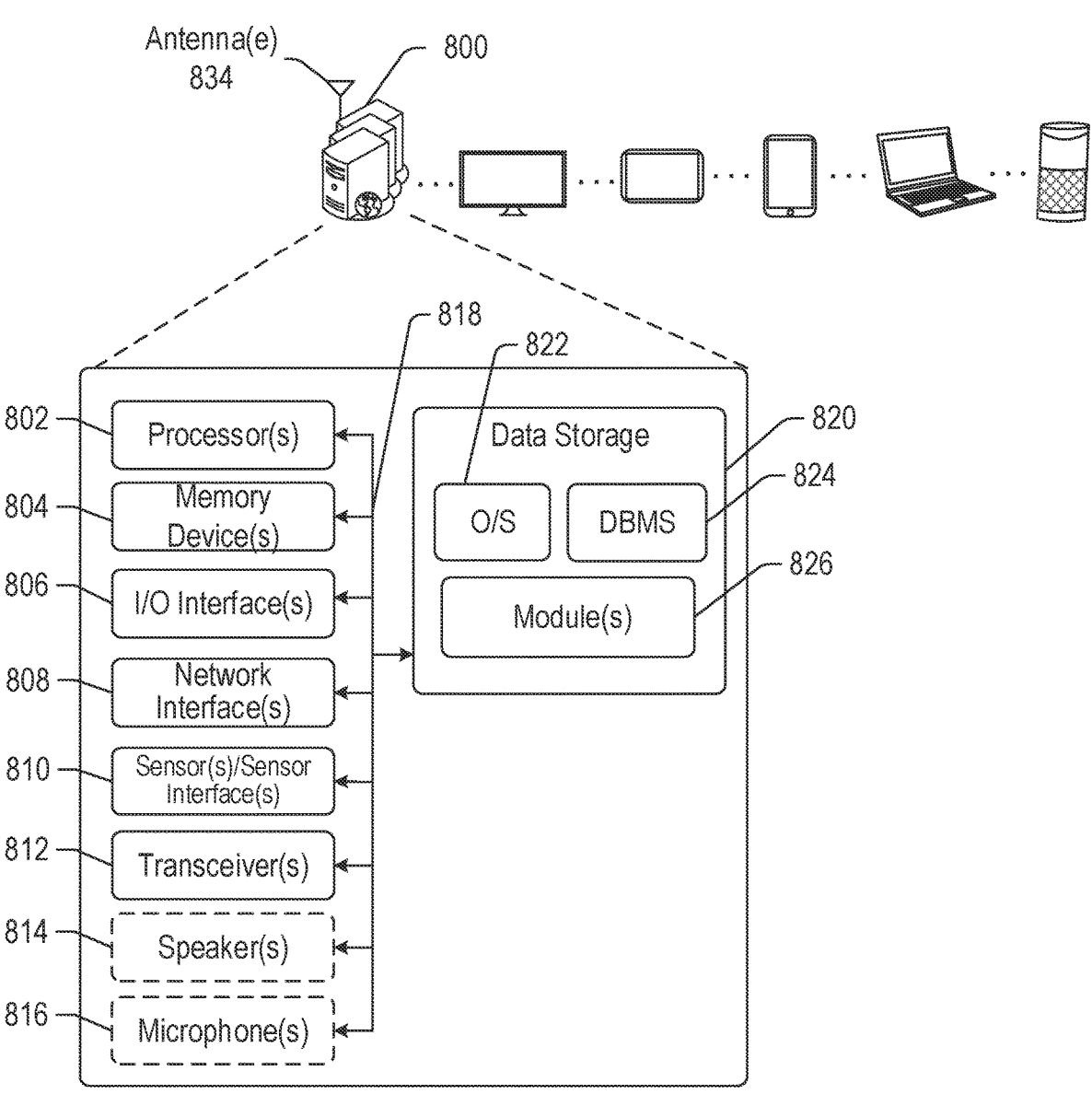
FIG. 8 depicts an example computing device, in accordance with one or more example embodiments of the disclosure.

FIG. 8 is a schematic block diagram of an illustrative computing device 800 in accordance with one or more example embodiments of the disclosure. The computing device 800 may include any suitable computing device capable of receiving and/or generating data including, but not limited to, a user device such as a smartphone, tablet, e-reader, wearable device, or the like; a desktop computer; a laptop computer; a content streaming device; a set-top box; or the like. The computing device 800 may correspond to an illustrative device configuration for the devices of FIGS. 1-7 (such as system 104, computing devices 702 and 706, user device 712, etc.).

The computing device 800 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 800 may include one or more processors (processor(s)) 802, one or more memory devices 804 (generically referred to herein as memory 804), one or more input/output (I/O) interface(s) 806, one or more network interface(s) 808, one or more sensors or sensor interface(s) 810, one or more transceivers 812, one or more optional speakers 814, one or more optional microphones 816, and data storage 820. The computing device 800 may further include one or more buses 818 that functionally couple various components of the computing device 800. The computing device 800 may further include one or more antenna (e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the computing device 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the computing device 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more module(s) 826. Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the computing device 800. Any data storaged in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include, for example, events data, keywords information, content information, keywords and content associations, etc.

The processor(s) 802 may be configured to access the memory 804 and execute computer-executable instructions loaded therein. For example, the processor(s) 802 may be configured to execute computer-executable instructions of the various program module(s), applications, engines, or the like of the computing device 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the module(s) 826 may include computer-executable instructions, code, or the like that responsive to execution by one or more of the processor(s) 802 may perform functions including, but not limited to, generation of keyword or other types of recommendations, automatically performing actions based on the recommendations, etc.

Referring now to other illustrative components depicted as being stored in the data storage 820, the O/S 822 may be loaded from the data storage 820 into the memory 804 and may provide an interface between other application software executing on the computing device 800 and hardware resources of the computing device 800. More specifically, the O/S 822 may include a set of computer-executable instructions for managing hardware resources of the computing device 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data storaged in the memory 804 and/or data storaged in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 800 is a user device, the DBMS 824 may be any suitable light-weight DBMS optimized for performance on a user device.

Referring now to other illustrative components of the computing device 800, the input/output (I/O) interface(s) 806 may facilitate the receipt of input information by the computing device 800 from one or more I/O devices as well as the output of information from the computing device 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna (e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 800 may further include one or more network interface(s) 808 via which the computing device 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna (e) 834 may include any suitable type of antenna depending, for example, on the communications protocols used to transmit or receive signals via the antenna (e) 834. Non-limiting examples of suitable antennas may include directional antennas, non-directional antennas, dipole antennas, folded dipole antennas, patch antennas, multiple-input multiple-output (MIMO) antennas, or the like. The antenna (e) 834 may be communicatively coupled to one or more transceivers 812 or radio components to which or from which signals may be transmitted or received.

As previously described, the antenna (e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11ad). In alternative example embodiments, the antenna (e) 834 may be configured to transmit or receive radio frequency signals within any suitable frequency range forming part of the unlicensed portion of the radio spectrum.

The antenna (e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna (e) 834—transmitting or receiving radio frequency (RF) signals in the bandwidth and/or channels corresponding to the communications protocols utilized by the computing device 800 to communicate with other devices. The transceiver(s) 812 may include hardware, software, and/or firmware for modulating, transmitting, or receiving—potentially in cooperation with any of antenna (e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computing device 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 814 may be any device configured to generate audible sound. The optional microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionalities described as being supported by any of the program module(s) depicted in FIG. 8 may be implemented, at least partially, in hardware and/or firmware across any number of devices.

It should further be appreciated that the computing device 800 may include alternate and/or additional hardware, software, or firmware components beyond those described or depicted without departing from the scope of the disclosure. More particularly, it should be appreciated that software, firmware, or hardware components depicted as forming part of the computing device 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    receiving input information including first information about first existing content associated with a content originator, second information about keywords associated with the content originator, and third information relating to an event corpus including a future event occurring at a second time;

predicting based on the second information about the future event, an increase in a number of keyword searches using a keyword that will occur based on the future event;

encoding, via a first processing pipeline that is allocated a first amount of computational resources, the first information and the third information into one or more first embeddings;

encoding, via a second processing pipeline that is allocated a second amount of computational resources that is greater than the first amount of computational resources, the second information and the third information into one or more second embeddings;

generating, by the first processing pipeline and second processing pipeline and using the one or more first embeddings and the one or more second embeddings, one or more pre-ranked lists of events in the event corpus to reduce latency associated with keyword associations with the content originator;

determining, by one or more machine learning models, that content included in the one or more pre-ranked list of events is related to the keyword;

generating, in real-time or near-real-time, based on the prediction, and prior to the future event, a recommendation for the content originator to perform an association between the keyword and the content such that the content or a hyperlink to the content is presented when the keyword is received in a keyword search via an application;

receiving an indication to perform the association between the keyword and the content;

receiving, during a time period associated with the future event, a keyword search including the keyword; and presenting, based on the association between the keyword and the content and receiving the keyword search, the content or a hyperlink to the content.

2. The method of claim 1, wherein the one or more machine learning models comprises a foundation model.

3. The method of claim 1, wherein determining the content is performed in parallel with predicting the keyword.

4. The method of claim 3, further comprising:

determining the association between the content and the future event using term frequency inversion; and determining the association between the keyword and the future event using a neural network.

5. A method comprising:

receiving input information including first information about first existing content associated with a content originator, second information about keywords associated with the content originator, and third information relating to an event corpus including a future event;

predicting based on the second information about the future event, an increase in a number of keyword searches using a keyword that will occur based on the future event;

encoding, via a first processing pipeline that is allocated a first amount of computational resources, the first information and the third information into one or more first embeddings;

encoding, via a second processing pipeline that is allocated a second amount of computational resources that is greater than the first amount of computational resources, the second information and the third information into one or more second embeddings;

generating, by the first processing pipeline and second processing pipeline and using the one or more first embeddings and the one or more second embeddings, one or more pre-ranked lists of events in the event corpus to reduce latency associated with keyword associations with the content originator;

determining, by one or more machine learning models, that content included in the one or more pre-ranked list of events is related to the keyword; and generating, in real-time or near-real-time, by the one or more machine learning models, based on the prediction, and prior to the future event, a recommendation for the content originator to perform an association between the keyword and the content such that the content or a hyperlink to the content is presented when the keyword is received in a keyword search via an application.

6. The method of claim 5, further comprising:

automatically producing the association between the keyword and the content;

receiving a keyword search including the keyword; and presenting, based on receiving the keyword search and the association between the keyword and the content, the content or the hyperlink to the content via the application.

7. The method of claim 5, wherein predicting the increase in the number of keyword searches using the keyword further comprises:

receiving, by the one or more machine learning models, an indication of the content, historical application traffic data, and real-time application traffic data; and predicting, by the one or more machine learning models, that the content will experience an increase in keyword searches based on the future event.

8. The method of claim 5, wherein the one or more machine learning models comprises a foundation model.

9. The method of claim 5, wherein determining further comprises:

determining the association between the content and the future event using term frequency inversion.

10. The method of claim 5, wherein predicting the keyword further comprises:

determining the association between the keyword and the future event using a neural network.

11. A system comprising:

memory that stores computer-executable instructions; and one or more processors configured to access the memory and execute the computer-executable instructions to:

receive input information including first information about first existing content associated with a content originator, second information about keywords associated with the content originator, and third information relating to an event corpus including a future event;

predict based on the second information about the future event, an increase in a number of keyword searches using a keyword that will occur based on the future event;

encode, via a first processing pipeline that is allocated a first amount of computational resources, the first information and the third information into one or more first embeddings;

encode, via a second processing pipeline that is allocated a second amount of computational resources that is greater than the first amount of computational resources, the second information and the third information into one or more second embeddings;

generate, by the first processing pipeline and second processing pipeline and using the one or more first embeddings and the one or more second embeddings, one or more pre-ranked lists of events in the event corpus to reduce latency associated with keyword associations with the content originator;

determine, by one or more machine learning models, that content included in the one or more pre-ranked list of events is related to the keyword; and generate, in real-time or near-real-time, by the one or more machine learning models, based on the prediction, and prior to the future event, a recommendation to perform an association between the keyword and the content such that the content or a hyperlink to the content is presented when the keyword is received in a keyword search via an application.

12. The system of claim 11, wherein the one or more processors are further configured to execute the computer-executable instructions to:

automatically produce the association between the keyword and the content;

receive a keyword search including the keyword; and present, based on receiving the keyword search and the association between the keyword and the content, the content or the hyperlink to the content via the application.

13. The system of claim 12, wherein predicting the increase in the number of keyword searches using the keyword further comprises:

receive, by the one or more machine learning models, an indication of the content, historical application traffic data, and real-time application traffic data, wherein generating the recommendation is performed by the one or more machine learning models; and predict, by the one or more machine learning models, that the content will experience an increase in keyword searches based on the future event.

14. The system of claim 11, wherein the one or more machine learning models comprises a foundation model.

15. The system of claim 11, wherein determining the content is performed in parallel with predicting the keyword.

16. The system of claim 15, wherein determining the content further comprises:

determine the association between the content and the future event using term frequency inversion.

17. The system of claim 15, wherein predicting the keyword further comprises:

determine the association between the keyword and the future event using a neural network.

\* \* \* \* \*